L. S. FITHIAN.
Improvement in Apparatus for Converting Motion.
No. 115,589.  Patented June 6, 1871.
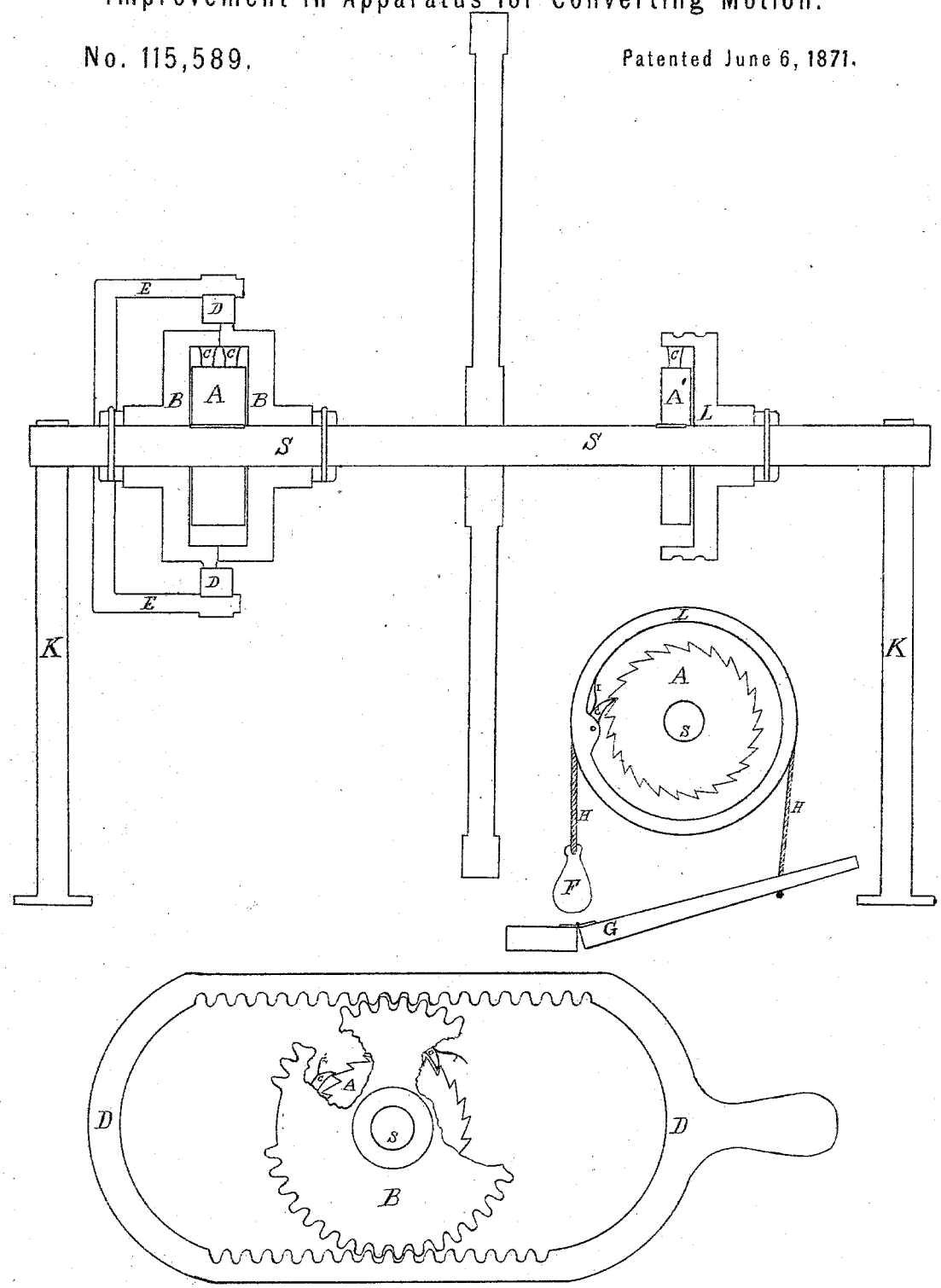

UNITED STATES PATENT OFFICE.

No. 115,589

LEMUEL SCUDDER FITHIAN, OF BROOKLYN, NEW YORK.

IMPROVEMENT IN APPARATUS FOR CONVERTING MOTION.

Specification forming part of Letters Patent No. 115,589, dated June 6, 1871.

Be it known that I, LEMUEL SCUDDER FITHIAN, of Brooklyn, Kings county, New York, have invented a new and Improved Full-Lever Crank without dead-centers or points; and I do hereby declare that the following is a full and exact description thereof, reference being had to the accompanying drawing and to the letters of reference marked thereon.

The nature of my invention consists of the shaft S S, supported by the frame K K; the ratchet-wheel A, fastened in the shaft; the hollow wheels or disks B B, loose on the shaft, one cogged half-way around on the upper side, and the other half-way around on the lower side; the dogs C C, held on the ratchet-wheel A by means of the springs I I; the longitudinal frame D, internally cogged on the upper and lower sides; the guides or supports E E, holding the frame D in place; also Fig. 2, in which is a modification upon the above-described device; the hollow wheel or disk L, loose on the shaft, grooved on the outer side, to allow the use of the cords H H, or their equivalents, fastened on the lower side of the disk L, one end passing over and back of the disk L, and attached to a suitable weight, F, the other passing over and forward, attached to the treadle G, as seen in Fig. 2; the hollow disk L, working in combination with the ratchet-wheel A, fast on the shaft by means of the dog C, held in place by the spring I.

To enable others skilled in the art to make and use my invention, I will proceed to describe its construction and operations, the different parts being constructed as above, and arranged upon shaft, as shown in cross-section view.

The drawing of the frame D forward will operate by means of the cogs on the upper portion of the hollow disks B B, and through the dogs and ratchet-wheel A, and cause a corresponding motion on the shaft, which may be called to the right. While this is being done the cogs upon the lower side of the frame will be acting on the cogs of the lower side of the disk B, which, by the natural reverse of the wheel or disk, will carry the other dog C back on the ratchet-wheel, ready for the reverse motion of the frame D, upon which reverse motion the lower set of cogs, acting on the lower side of the disk B, will give a right direction to its dog, thus advancing the shaft to the right, whether the action of the frame is right or reverse; so there is consequently a forward motion of the shaft whether the motion of the frame D be forward or backward. Also, in Fig. 2, the ratchet-wheel A, fast on the shaft, the hollow disk L, grooved on the outer side, and working loose on the shaft, the disk L, by means of the dog C, giving the ratchet-wheel and shaft a forward motion, the motion being given by means of the cords H H, or their equivalents, fastened on the lower side of the disk, and running in the grooves, one end running over and forward, and attached to the treadle G, which, being pushed down, gives a forward motion to the shaft.

When the treadle is released the weight F, attached to the other end of the cord, carries the disk L, in connection with the dog C, back, ready for another forward motion, by means of the treadle. Nor do I intend to confine myself to this alone, but, by using two ratchet-wheels, one reversed, in combination with the proper dogs, producing forward or backward motion at pleasure.

What I claim as my invention, and desire to secure by Letters Patent, is—

1. The arrangement of ratchet-wheel A upon shaft S, in combination with disks B B and partly-cogged and spring-dogs C C, substantially as and for the purposes set forth.

2. The longitudinal frame D, internally cogged and working within guides E E, in combination with and acting upon the gear of disks B B, substantially as and for the purposes set forth.

3. The ratchet-wheel A', in combination with the single disk or wheel L, grooved on its outer side, substantially as and for the purposes set forth.

4. The arrangement of the single disk or wheel L, grooved on its outer side, in combination with the ratchet-wheel A, and in combination with the spring-dog C, substantially as and for the purposes described.

5. The cord or its equivalent H H, passing over the grooves of the pulley L, and having the treadle attached to one end and the weight to the other, substantially as and for the purposes set forth.

LEMUEL SCUDDER FITHIAN.

Witnesses:
FRANCIS FORBES,
J. W. SOUTHMAYD.